United States Patent [19]
Galaj et al.

[11] Patent Number: 5,844,069
[45] Date of Patent: Dec. 1, 1998

[54] COPOLYMERS HAVING MAGNETIC PROPERTIES

[75] Inventors: Stanislas Galaj, Arcueil; Alain Le Mehaute, Gif Sur Yvette, both of France

[73] Assignee: Alcatel Alsthom Compagnie Generale D'Electricite, Paris Cedex, France

[21] Appl. No.: 366,110

[22] Filed: Dec. 29, 1994

Related U.S. Application Data

[62] Division of Ser. No. 986,011, Dec. 4, 1992, Pat. No. 5,408,034.

[30] Foreign Application Priority Data

Dec. 6, 1991 [FR] France .................................. 91 15182

[51] Int. Cl.⁶ .................................................. C08G 73/00
[52] U.S. Cl. ...................... 528/422; 528/210; 528/271; 528/327; 528/331; 528/391; 528/399
[58] Field of Search ..................... 528/210, 327, 528/422, 391, 399, 331, 271

[56] References Cited

U.S. PATENT DOCUMENTS

| | | | |
|---|---|---|---|
| 4,629,540 | 12/1986 | Genieès et al. .......................... | 528/422 |
| 4,874,481 | 10/1989 | Suzuki et al. .......................... | 204/59 R |
| 5,008,041 | 4/1991 | Cameron et al. ....................... | 252/500 |
| 5,039,785 | 8/1991 | Irwin ..................................... | 528/315 |
| 5,093,439 | 3/1992 | Epstein et al. .......................... | 525/540 |
| 5,147,968 | 9/1992 | Epstein et al. .......................... | 528/210 |

FOREIGN PATENT DOCUMENTS

A-3716284  11/1988  Germany.

OTHER PUBLICATIONS

Paten Abstracts Of Japan, vol. 12, No. 482 (c–553) Dec. 15, 1988 for JP–A–63–199741 (Mitsui Mining & Smelting Co.) Aug. 18, 1988.

Patent Abstracts Of Japan, vol. 13, No. 348 (E–799) Aug. 4, 1989 for JP–A–1–108780 (Seiko Epson Corp.) Apr. 26, 1989.

*Primary Examiner*—P. Hampton-Hightower
*Attorney, Agent, or Firm*—Sughrue, Mion, Zinn, Macpeak & Seas, PLLC

[57] ABSTRACT

The invention provides copolymers having magnetic properties, said copolymers containing aminoaromatic groups, and being based on a structural unit comprising:

a first group of aminoaromatic compounds chosen from aniline derivatives and the corresponding iminoquinone forms; and a second group of substituted aminoaromatic compounds chosen from substituted amino compounds containing at least two condensed benzene rings, substituted polycyclic compounds containing at least one aniline structural unit in their structure, compounds derived from aniline and carrying a substituent bonded to the ring by means of an ethynylidene or paraphenylene link, and the corresponding iminoquinone compounds.

12 Claims, 8 Drawing Sheets

COPOLYMERS HAVING MAGNETIC PROPERTIES

This is a divisional of application Ser. No. 07/986,011 filed Dec. 4, 1992 now U.S. Pat. No. 5,408,034.

FIELD OF THE INVENTION

The present invention relates to copolymers having magnetic properties and containing aminoaromatic groups. It also relates to methods of preparing the copolymers and to uses thereof.

BACKGROUND OF THE INVENTION

New self-doped polyanilines, whose benzene and/or quinone rings carry substituent or functionalized grafted chains such that their terminal functions, of the proton generator type, are separated from the ring by at least three atoms, and a method for preparing such polyanilines have been disclosed in French Patent Application No. 91 05578 filed on May 7, 1991 by the Applicant. Such polyanilines have advantageous electromagnetic properties, and in particular they have propagation parameters, electromagnetic impedance parameters, and propagation constants that enable them to be used in microwave applications.

Such polyanilines are capable of retaining their properties for a few minutes at about 170° C., or for several hours at 130° C. They can therefore be implemented in extrusion machines, and more generally in plastics equipment. Those polyanilines are decomposed above 180° C., with sulfamides being formed in an intermediate stage, when the grafted chain includes a sulfonic substituent.

However, the electromagnetic properties of those polyanilines are as yet insufficient for many uses.

SUMMARY OF THE INVENTION

An object of the present invention is to provide copolymers having magnetic properties, in particular improved thermal stability and saturation magnetization.

The invention provides copolymers having magnetic properties and containing aminoaromatic groups based on a structural unit comprising:

a first group of aminoaromatic compounds chosen from aniline derivatives and the corresponding iminoquinone forms; and a second group of substituted aminoaromatic compounds chosen from substituted amino compounds containing at least two condensed benzene rings, substituted polycyclic compounds containing at least one aniline structural unit in their structure, compounds derived from aniline and carrying a substituent bonded to the ring by means of an ethynylidene or paraphenylene link, and the corresponding iminoquinone compounds.

Preferably, the copolymers are based on said structural unit comprising said first group referred to as B and said second group referred to as C, said groups B and C being either in the aminoaromatic form or in the corresponding iminoquinone form, and satisfy the following general formula:

In said group B, $R_i$, where i=1, 2, and 3, ($R_1$, $R_2$, and $R_3$), is chosen from hydrogen, the —$CF_3$ radical, and a substituent having the formula —A—Z, in which A is a hydrocarbon radical of 2 to 8 carbon atoms in which radical at least one heteroatom chosen from O and S is inserted, and Z is at least one proton donor substituent or one of the salts thereof, such as, for example, a sulfonic radical or a carboxylic radical, whether it is carried or not by an alkyl chain or an alkoxyalkyl chain.

In said group B, $R_4$ is chosen from hydrogen, an alkyl radical, an aryl radical, and derivatives thereof.

In said group C, X is chosen from a polyaromatic ring having at least two condensed benzene rings, a polycyclic ring, and an aromatic ring carrying a substituent bonded to the ring by means of an ethynylidene or phenylene link.

In said group C, Y is at least one substituent chosen from the following substituents: nitro, nitroso, fluoro, chloro, bromo, alkyl, and alkoxyalkyl, whether or not they are carried by an alkyl or alcoxyalkyl chain, and from sulfonic, phosphonic and carboxylic substituents.

In said general formula, X and y are low integers lying in the range 1 to 3, and n is an integer greater than 6, and as high as possible.

Preferably, X is a naphthalene ring.

In one embodiment, the copolymers are doped, and are therefore conductive. Depending on the monomers used, the copolymers of the invention may be self-doped, but otherwise, they may be doped so as to make them conductive. The exchange correlation on electrons having opposite spins would suggest that, in the phase diagram, there is a zone where Cooper pairs are constituted, in which region the polymers are superconductive. This property is highlighted by the diamagnetic behavior of the copolymer at low temperature.

In the general formula, advantageously, on average, one fourth of said groups B and/or C is in quinone form. In this way maximum conductivity is obtained for the copolymer. It is also advantageous in the general formula, for, on average, half of said groups C to be of the substituted aminoaromatic type, and the other half to be of the substituted iminoquinone type.

Advantageously, in said general formula, y=1 and x=1, the bond X-Y is rigid, thus giving priority to certain internal bonds, and Y is at least one proton donor substituent, in which case said copolymers are mainly ferromagnetic.

Preferably, Y is chosen from a sulfonic, a phosphonic, and a carboxylic substituent.

Also preferably, said group C is chosen from Cleve acids: 8-amino-2-naphthalenesulfonic acid (form θ) and 5-amino-2-naphthalenesulfonic acid (form β), Laurent acid: 1-amino-5-naphthalenesulfonic acid, Peri acid: 1-amino-8-naphthalenesulfonic acid, and the diacids: 1-naphthylamino-5,7-disulfonic acid and 1-naphthylamino-6,8-disulfonic acid.

The invention also provides a method of manufacturing copolymers of the invention, said method comprising:

a first step during which the following are copolymerized, in solution or in suspension:

a first monomer which is an aniline optionally substituted with the —$CF_3$ radical, or with a substituent having the formula —A—Z, in which A is a hydrocarbon radical of 2 to 8 carbon atoms in which radical at least one heteroatom chosen from O and S is inserted, and Z is at least one proton donor substituent or one of the salts thereof; and a second monomer which is a substituted aminoaromatic compound chosen from substituted amino compounds containing at least two condensed benzene rings, substituted polycyclic compounds containing at least one aniline structural unit in their structure, compounds derived from aniline and carrying a substituent bonded to the ring by means of an ethynylidene or paraphenylene link, and the corresponding iminoquinone compounds; and a second step during which the resulting copolymer is separated from the solution or the suspension.

The manufacturing method of the invention also preferably has at least one of the following characteristics:

the copolymerization is performed in an acid aqueous medium chosen from aqueous solutions of sulfuric acid, of paratoluenesulfonic acid, of formic acid, and of phosphoric acid;

the copolymerization is performed by slowly adding a solution of an oxidizing agent to the mixture of the monomers in the acid medium;

preferably, the oxidant is a compound from the group comprising persulfates, bichromates, chromates, iodates, permanganates, and oxygenated water;

in a variant, the oxidation is performed in the presence of a live active electrode and/or of a catalyst, thereby enabling the oxidation of the copolymer to be adjusted; and after separating said resulting copolymer from the reactive medium by filtering and washing, a soluble phase is extracted by dissolving the copolymer in an ammonia solution, and a portion of said copolymer is then recrystallized by evaporating said ammonia solution; the object of this step is to remove the insoluble impurities of the polymer and to make its texture uniform.

In a variant of the method, the last-mentioned operation is also performed by using anhydrous liquid ammonia.

The invention also provides a method of shaping the copolymer of the invention, in which method:

the copolymer is put in suspension or in solution to form a ferro-fluid; confined in a magnetic field, it can be used, for example, as a magnetic seal;

the copolymer, where Y is a proton donor, is salified with a voluminous base such as a tetraalkylammonium hydroxide; the object of this operation is to render the polymer meltable so as to enable it to be deposited in a thin layer;

the copolymer is put in a suspension or in a solution, and is then deposited in a thin layer;

the thin-layer deposition is performed between at least two magnetic layers that are different from the deposited layer, said layers being chosen from diamagnetic, ferromagnetic, ferrimagnetic, and paramagnetic layers; and the thin layer is of nanometric thickness.

The copolymers of the invention have numerous uses due to their high magnetic properties. They may be partially recrystallized in thin layers on media, such as polyethylene, polyvinyl chloride, polymethyl methacrylate, polycarbonates, and epoxy resins. They may be used in this way as media for written data, in particular for bank cards or bills, and also as photographic or radiographic media.

The deposition may performed in one or more thin layers, optionally separated by diamagnetic layers or ferro, ferri, or paramagnetic layers that are different from the recrystallization layers. The deposition layer may be extremely thin, e.g. about one nanometer thick, and this enables it to be used in various microscope techniques: tunnelling microscopes, atomic force microscopes, near-field microscopes, and evanescent-wave microscopes.

The copolymers may also be used in microwave devices, in particular waveguides, circulators, polarizers, absorbants, screening, and microwave filters.

They are also suitable for use in optical systems, in particular display screens, dichroic systems, X-ray diffraction or absorption systems, and optical fiber multiplexing systems.

They may also be used generally in electro-magneto-optical systems, and electro-magneto-resistive systems.

The copolymers enable their magnetic properties to be adjusted for use in magnetism control devices, the adjustment may be performed chemically by means of a catalytic structure, electrochemically, mechanically by means of pressure, and in particular by means of a piezoelectric material, or by thermal means.

They enable magnetic seals or adhesives to be obtained.

More generally, they may be used in electrical equipment, such as motors, transformers, and inductors, in which they enable non-metallic magnetic materials to be used.

BRIEF DESCRIPTION OF THE DRAWINGS

Other characteristics and advantages of the present invention will appear on reading the following descriptions of embodiments given by way of non-limiting example with reference to the accompanying drawings, in which:

in FIGS. 1 and 2, the derivative of differential temperature DTA (in $\mu$volts) is given up the left-hand ordinate, and the loss in weight TG in % and the derivative thereof DTG (in $\mu$volts) is given up the right-hand ordinates; temperature θ in degrees Celsius is given along the abscissa, and the top horizontal straight line represents the weight of the reference sample;

in FIGS. 3 to 5, the field H in tesla is given up the ordinate, and the signal M, which represents the variation in magnetization, is given in relative units along the abscissa;

in FIG. 6, absolute temperature T in kelvins is given up the ordinate, and the signal M in relative units is given along the abscissa;

in FIGS. 7 and 8, the magnetic field H in oersteds is given along the abscissa, and the signal M in relative units is given up the ordinate.

DETAILED DESCRIPTION OF THE INVENTION

EXAMPLE 1

In a 250 ml Erlenmeyer flask, a mixture was made containing 10 g of 5-amino-2-naphthalenesulfonic acid, 4.2 g of aniline, 20 ml of 96% sulfuric acid and 100 ml of water, with the mixture being stirred continuously at about 20° C. An oxidizing solution of 7.25 g of potassium iodate in 180 ml of water was added drop by drop over a period of 24 hours. A powder formed which was filtered, washed, and dried. 8 g of powder were obtained.

1 g of the powder was treated with ammonia and was filtered. The non-soluble residue was stored. The dark blue filtrate was evaporated, and the resulting green and blue flakes were dried for a few seconds by a hot air blower. The resulting flakes were ferromagnetic and had the following general formula:

The resulting product was heat treated, successively at 130° C. (1 hour), at 150° C. (½ hour) and at 170° C. (½ hour), without the observations associated with its magnetic properties at ambient temperature being affected.

Figure 1:
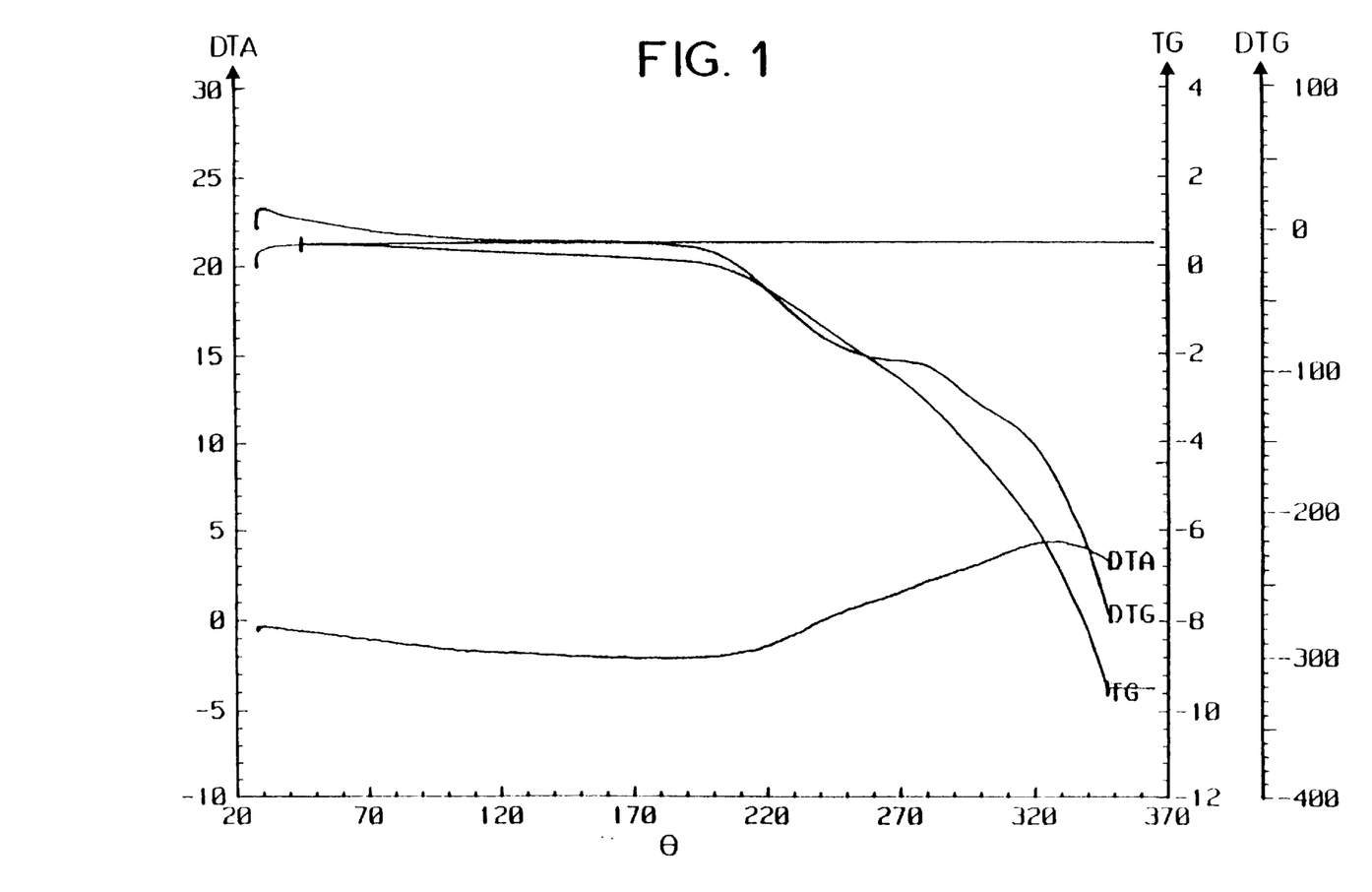
FIG. 1 shows the differential thermal analysis curve and the thermogravimetric analysis curve of a copolymer of the invention in air.
Figure 2:
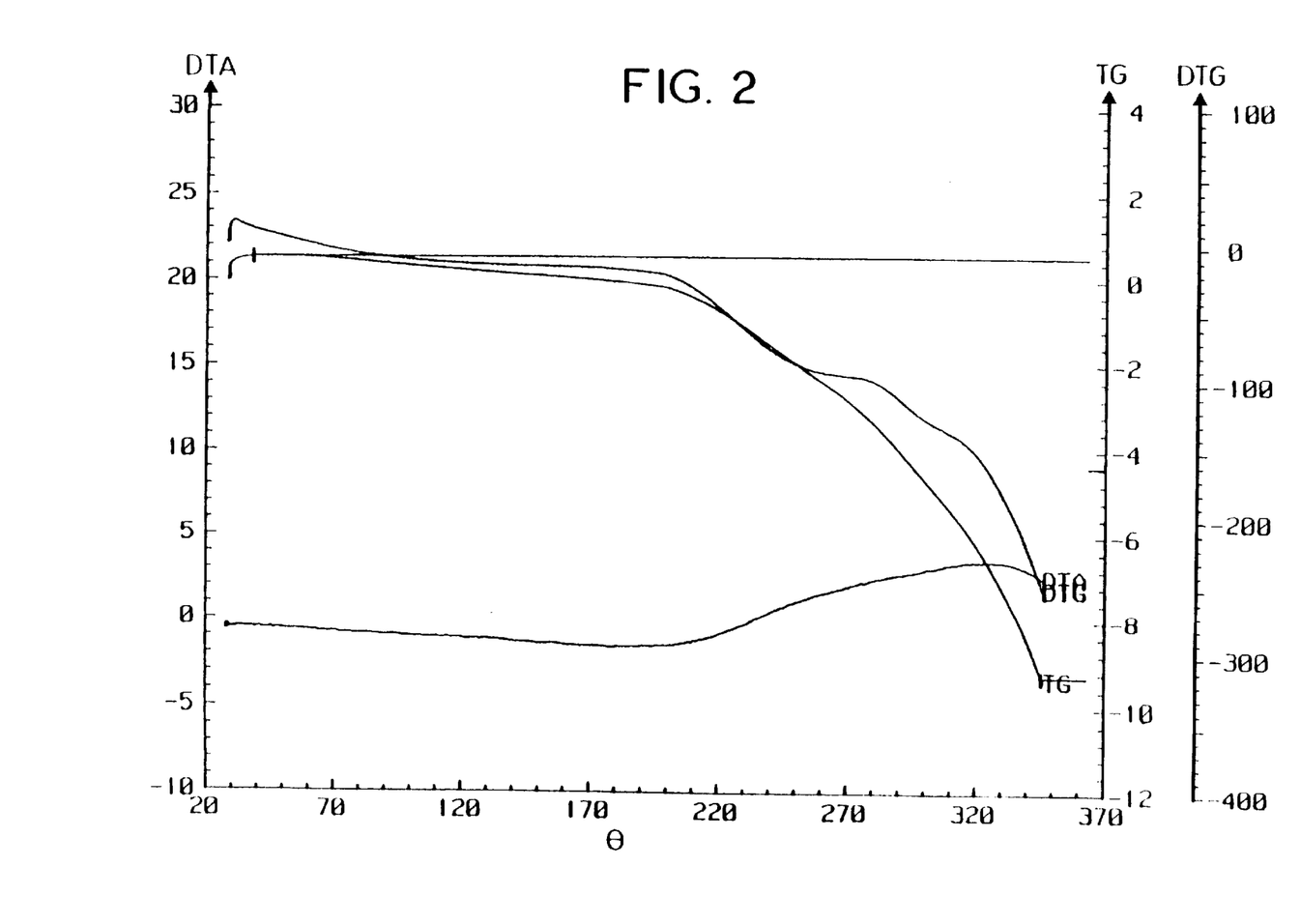
FIG. 2 is analogous to FIG. 1, but the analyses were performed in argon.

To verify the thermal stability of the copolymer, differential thermal analysis and thermogravimetric analysis tests were performed on samples of the copolymer. The results of the tests are shown in FIGS. 1 and 2 of the drawings, which figures show the thermal behavior of the materials in air and in argon, under the following operating conditions:

|  | FIG. 1 | FIG. 2 |
| --- | --- | --- |
| Weight of the sample | 99.90 mg | 101.10 mg |
| Reference sample (kaolin) | 99.90 mg | 99.80 mg |
| Crucible | alumina | alumina |
| Medium | air | argon |

Magnetization measurements were taken on the resulting product by using the SQUID (Superconducting Quantum Interference Device) method which consists in disposing the product in a tube, then inserting the tube up inside a superconducting coil, and then counting the number of Bohr magnetons that are passed.

Figure 3:
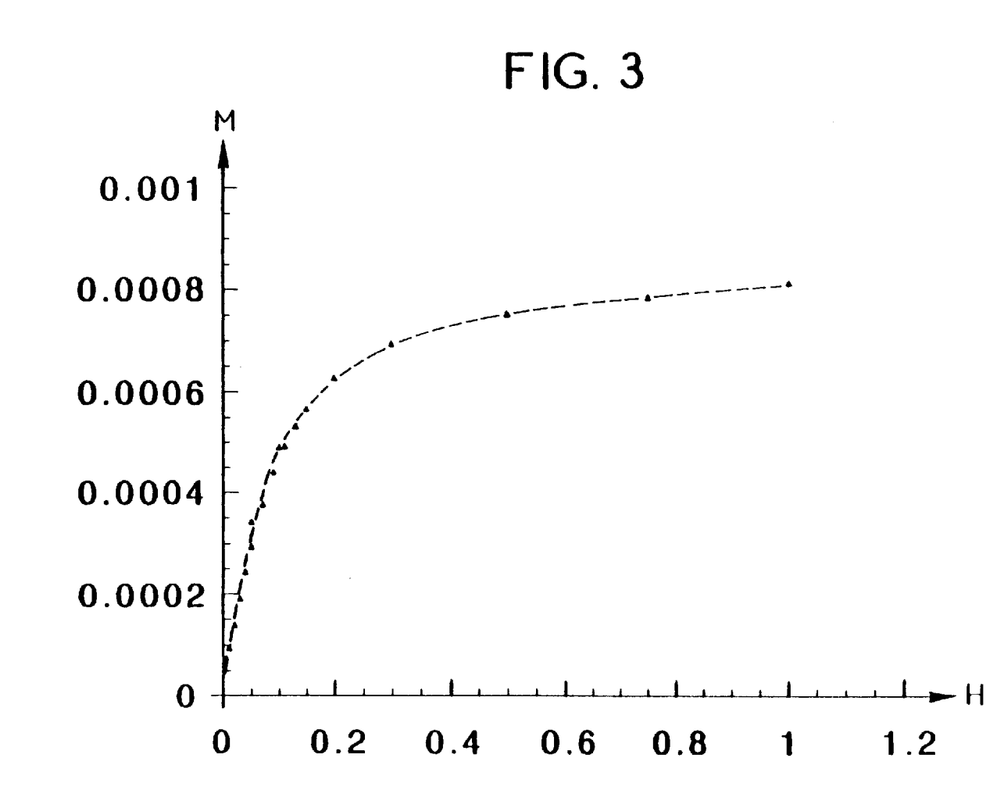
FIG. 3 is a first magnetization curve showing the variation in magnetic signal M as a function of field H for a temperature of 10K.
Figure 4:
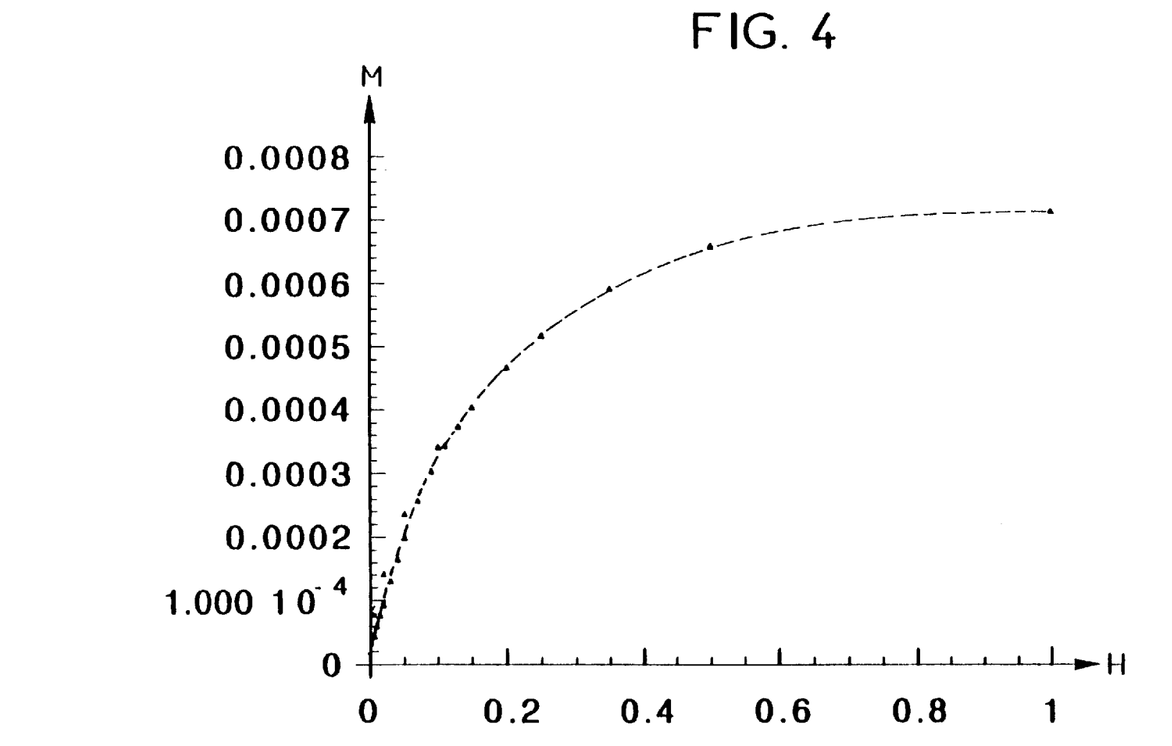
FIG. 4 is analogous to FIG. 3 for a temperature of 100K.
Figure 5:
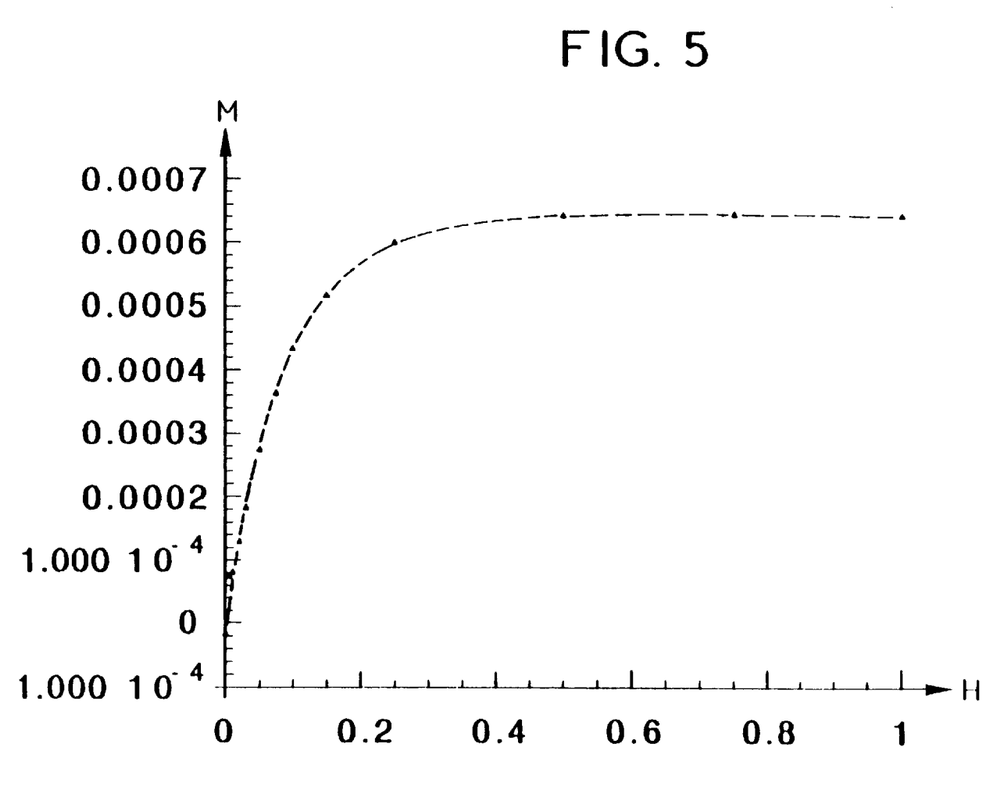
FIG. 5 is analogous to FIG. 3 for a temperature of 280K.
Figure 6:
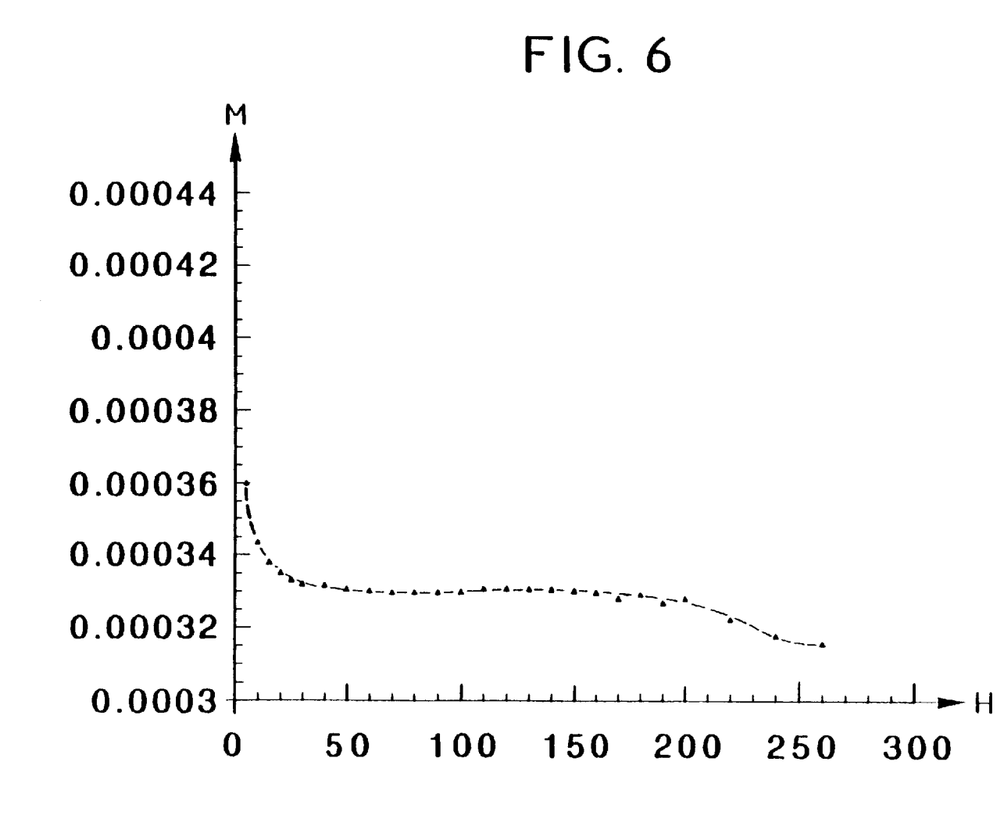
FIG. 6 shows the variation in the magnetic signal M as a function of absolute temperature T in kelvins for a field of 1,000 gauss (0.1 tesla)

The results of the measurements are shown by the curves in FIGS. 3 to 6. FIGS. 3, 4 and 5 show the variation in magnetic signal M as a function of field for temperatures of 10K, 100K, and 280K. FIG. 6 shows the variation in magnetic signal M as a function of absolute temperature for a field of 1,000 gauss.

The saturation magnetization of the sample was calculated, and the result was 10 Gauss electromagnetic units/gram, which is a much higher value than values obtained previously with organic compounds.

The variation in saturation magnetization as a function of temperature at 1,000 gauss was studied, and it appeared that ferromagnetism existed up to temperatures greater than ambient temperature. This study also revealed the existence of an order transition (diamagnetic/ferromagnetic) at 170K. It also enabled the Curie temperature to be evaluated as being about 350K (77° C.).

An additional susceptometer test confirmed the existence of ferromagnetism at ambient temperature with positive values for the constant expressing magnetic permeability as a function of the induction/field ratio with real terms of about $0.14 \times 10^{-4}$ at 120K. This test also revealed an order transition at 170K.

EXAMPLE 2

One fifth of a solution L composed of 4.2 g of aniline in 25 ml of 10% hydrochloric acid was added to a 250 ml Erlenmeyer flask containing a mixture being stirred composed of 10 g of 5-amino-2-naphthalenesulfonic acid and 75 ml of 10% hydrochloric acid. The reactive mixture was maintained at about 20° C. One fifth of a solution P composed of 7.25 g of potassium iodate in 180 ml of water was added drop by drop over a period of 1 hour.

At the end of that period, a second fifth of solution L was added to the Erlenmeyer flask and a second fifth of solution P was added drop by drop over a period of 1 hour. This operation was repeated three times.

The copolymer was dissolved in a concentrated ammonia solution (having a density of 0.895). A soluble phase constituted by a high concentration of copolymers having chains rich in naphthalene groups was then separated, as was an insoluble phase mainly constituted by a polyaniline chain containing a low concentration of naphthalene groups. The soluble phase was then collected, and it was evaporated and dried to give ultramarine colored flakes which were displaced in a weak magnetic field. The resulting product was ferromagnetic and had the following general formula:

This product may be deposited in thin layers on substrates such as polymethyl-methacrylate, glass, etc.

EXAMPLE 3

The operating method used in example 2 was repeated with 5 g of 1-amino-naphthalene and 4.2 g of aniline. 2.2 g of paramagnetic copolymer having the following general formula were obtained:

This copolymer was not conductive due to the absence of an acid group.

EXAMPLE 4

A solution composed of 0.725 g of potassium iodate, 25 ml of water, and 1 ml of concentrated sulfuric acid was added drop by drop over a period of 3 hours at ambient temperature to a 50 ml Erlenmeyer flask containing a mixture being stirred composed of 10 ml of water, 1 ml of concentrated sulfuric acid, 0.42 mg of aniline, and 10 g of 5-amino-2-naphthalenesulfonic acid. 30 minutes after the end of the addition period, the suspension was centrifuged, and the residue was then redispersed in a plurality of washing solutions before being centrifuged again.

Figure 7:
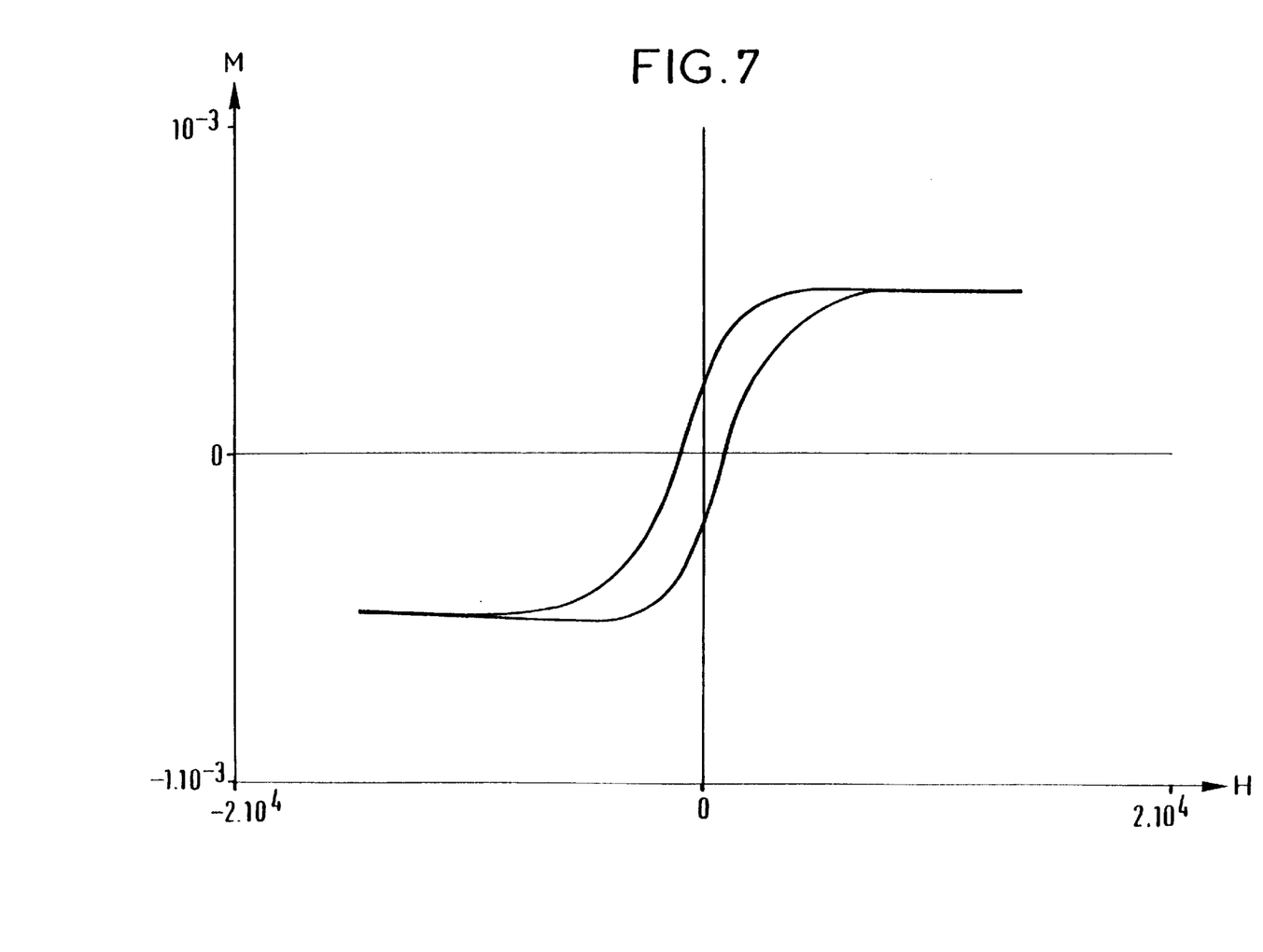
FIG. 7 shows the variation in the magnetic signal M as a function of the cyclic variation in the field H for a ferromagnetic copolymer.

After drying under a vacuum, 70 mg of dark green powder having the following general formula were obtained:

Analyzing it at 300K by means of an alternating field gradient magnetometer showed that it was ferromagnetic and had a strong coercive field (maximum external magnetic field not giving rise to demagnetization) of about 1,000 oersteds, as shown in FIG. 7.

EXAMPLE 5

2.78 g of ammonium peroxydisulfate in powder form was added in small pinches to a 25 ml beaker containing 0.825 g of N-phenyl-paraphenylene diamine (a dimer of aniline), 1 g of 5-amino-2-naphthalenesulfonic acid, 10 ml of formic acid, and 2 g of paratoluenesulfonic acid. The reactive medium was stirred and maintained at ambient temperature during the addition. About 10 minutes after the end of the addition period, the residue is separated from the reactive medium by centrifuging and washing. After drying, 1.584 g of a paramagnetic and conductive dark green powder having the following general formula were obtained:

EXAMPLE 6

Figure 8:
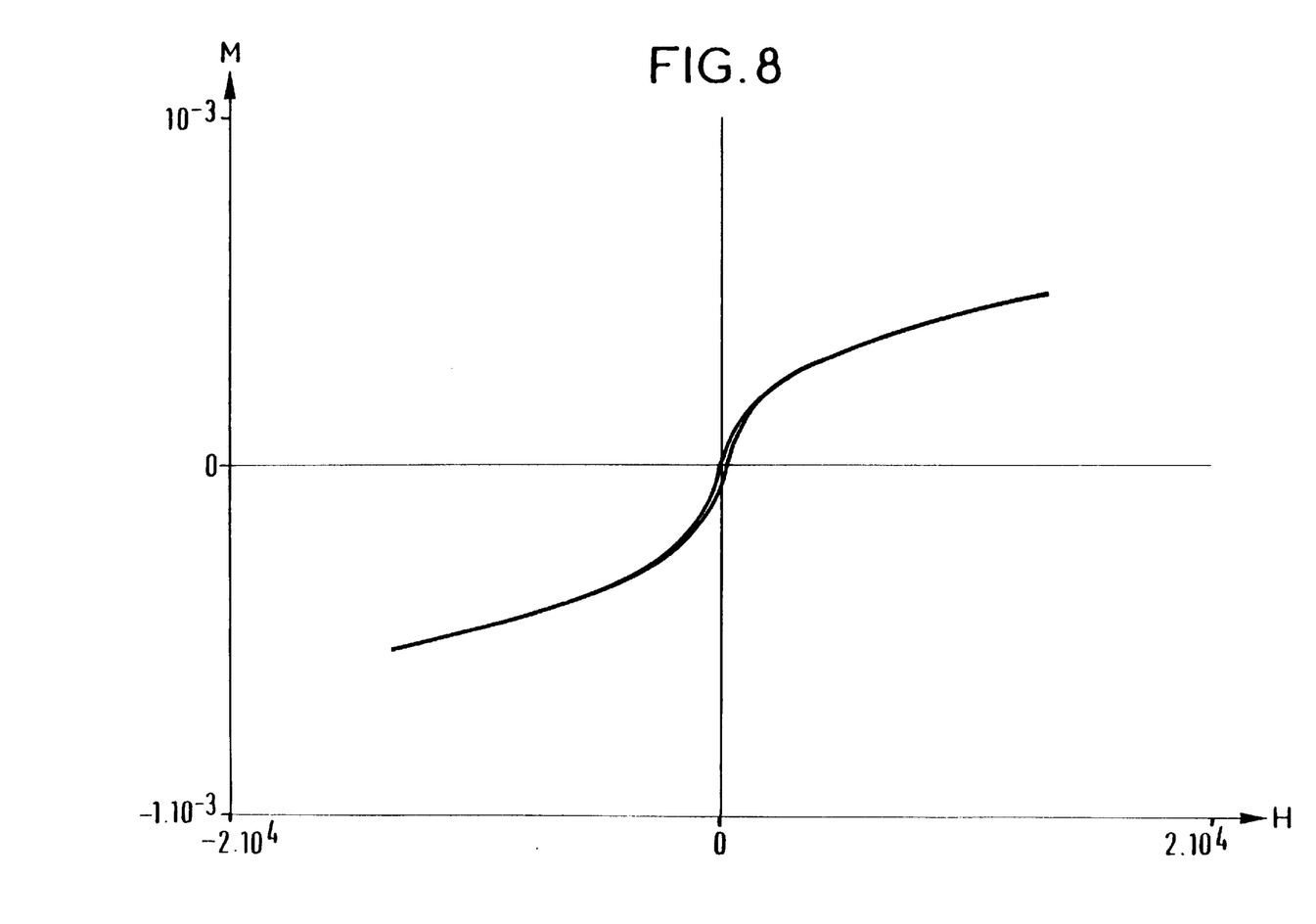
FIG. 8 is analogous to FIG. 7 for a copolymer having combined ferromagnetic/paramagnetic characteristics.

A solution composed of 0.5 g of 5-amino-2-naphthalene-sulfonic acid, 5 ml of water, and 1 ml of concentrated ammonia (d=0.89) was poured into a 25 ml beaker containing 0.42 g of N-phenyl-paraphenylene diamine (a dimer of aniline), and 10 ml of formic acid. The suspension formed was stirred vigorously at ambient temperature. 0.6 ml of 30% oxygenated water was then added. After 5 minutes of reaction, the copolymer was recovered and washed in the same way as in example 5. The copolymer obtained had the following general formula:

The resulting blackish powder (80 mg) had strong combined ferromagnetic/paramagnetic characteristics at 300K. The coercive field was about 70 oersteds as shown in FIG. 8.

Naturally, the present invention is not limited to the above-described embodiments. Many variants of it are accessible to a person skilled in the art without going beyond the spirit of the invention.

What is claimed is:

1. A method of manufacturing a copolymer, said method being characterized in that it comprises:
    a first step during which the following are copolymerized, in solution or in suspension:
        a first monomer which is an aniline optionally substituted with the —CF$_3$ radical, or with a substituent having the formula —A—Z, in which A is a hydrocarbon radical of 2 to 8 carbon atoms in which radical at least one heteroatom selected from the group consisting of O and S is present and Z is at least one proton donor substituent or one of the salts thereof; and a second monomer which is a substituted aminoaromatic compound selected from the group consisting of substituted amino compounds containing at least two condensed benzene rings, substituted polycyclic compounds containing at least one aniline structural unit in their structure, compounds formed directly from aniline and having a substituent bonded to the ring by means of an ethynylidene or paraphenylene link, and the corresponding iminoquinone compounds; and a second step during which the resulting copolymer is separated from the reactive medium, wherein said copolymer has magnetic properties, said copolymer comprising structural units comprising:

a first group of aminoaromatic compounds selected from the group consisting of compounds formed directly from aniline and the corresponding quinone forms; and a second group of substituted aminoaromatic compounds selected from the group consisting of substituted amino compounds containing at least two condensed benzene rings, substituted polycyclic compounds containing at least one aniline structural unit in their structure, compounds formed directly from aniline and having a substituent bonded to the ring by an ethynylidene or paraphenylene link, and the corresponding quinone compounds, wherein the substituted amino compounds contain at least one substituent selected from the group consisting of nitro, nitroso, fluoro, chloro, bromo, sulfonic, phosphonic and carboxylic substituents.

2. A method according to claim 1, characterized in that the copolymerization is performed in an acid aqueous medium selected from the group consisting of aqueous solutions of sulfuric acid, of paratoluenesulfonic acid, of formic acid, and of phosphoric acid.

3. A method according to claim 1, characterized in that the copolymerization is performed by adding periodically in small amounts a solution of an oxidizing agent to the mixture of the monomers in the acid medium.

4. A method according to claim 3, characterized in that, said oxidizing agent is a compound selected from the group consisting of persulfates, bichromates, chromates, iodates, permanganates, and oxygenated water.

5. A method according to claim 3, characterized in that the oxidation is performed in the presence of a live active electrode and/or of a catalyst.

6. A method according to claim 1, characterized in that crystallization is performed in a magnetic and/or an electric field.

7. A method according to claim 1, characterized in that, after separating said resulting copolymer from the reactive medium by filtering and washing, a soluble phase is extracted by dissolving said copolymer in an ammonia solution, and a portion of said copolymer is then recrystallized by evaporating said ammonia solution.

8. A method according to claim 1, characterized in that, after said resulting copolymer has been separated from the reactive medium, a soluble phase is extracted from said copolymer by anhydrous liquid ammonia, and said copolymer is then recrystallized by evaporating the ammonia.

9. A method of making a copolymer, comprising a process step in which a copolymer carrying a proton donor substrate is salified with a voluminous base, wherein said copolymer has magnetic properties, said copolymer comprising structural units comprising:

a first group of aminoaromatic compounds selected from the group consisting of compounds formed directly from aniline and the corresponding quinone forms; and a second group of substituted aminoaromatic compounds selected from the group consisting of substituted amino compounds containing at least two condensed benzene rings, substituted polycyclic compounds containing at least one aniline structural unit in their structure, compounds formed directly from aniline and carrying a substituent bonded to the ring by an ethynylidene or paraphenylene link, and the corresponding quinone compounds.

10. A method of making a copolymer according to claim 9, wherein said voluminous base is tetraalkylammonium hydroxide.

11. A method of making a copolymer according to claim 1, wherein the method further comprises a process step in which a copolymer carrying a proton donor substrate is salified with a voluminous base.

12. A method of making a copolymer according to claim 11, wherein said voluminous base is tetraalkylammonium hydroxide.

* * * * *